US007178546B2

(12) United States Patent
Gremillion, III

(10) Patent No.: US 7,178,546 B2
(45) Date of Patent: Feb. 20, 2007

(54) VALVE COVER

(75) Inventor: Jack P. F. Gremillion, III, Baton Rouge, LA (US)

(73) Assignee: Linelox, LLC, Baton Rouge, LA (US)

( * ) Notice: Subject to any disclaimer, the term of this patent is extended or adjusted under 35 U.S.C. 154(b) by 300 days.

(21) Appl. No.: 10/958,445

(22) Filed: Oct. 4, 2004

(65) Prior Publication Data
US 2006/0070662 A1    Apr. 6, 2006

(51) Int. Cl.
*F16K 35/00*    (2006.01)
(52) U.S. Cl. .............................. 137/15.01; 137/15.18; 137/377; 137/382
(58) Field of Classification Search ............ 137/15.01, 137/15.18, 377, 382
See application file for complete search history.

(56) References Cited

U.S. PATENT DOCUMENTS

| 116,326 | A | * | 6/1871 | Koche ......................... 137/382 |
| 748,720 | A | * | 1/1904 | Glazier ........................ 70/178 |
| 1,084,996 | A | | 1/1914 | Wright |
| 1,439,552 | A | | 12/1922 | Johnson |
| 1,829,444 | A | | 10/1931 | Goebel et al. |
| 1,833,924 | A | | 12/1931 | Wayer |
| 2,206,707 | A | | 7/1940 | Shaw |
| 3,245,240 | A | | 4/1966 | De Forrest |
| 3,284,121 | A | | 11/1966 | Lyon |
| 3,981,165 | A | | 9/1976 | Wersinger |
| 4,254,888 | A | | 3/1981 | Chandler |
| 4,377,245 | A | | 3/1983 | Patty |
| 4,405,161 | A | | 9/1983 | Young et al. |
| 4,422,314 | A | * | 12/1983 | Cooper ........................ 70/242 |
| 4,457,445 | A | | 7/1984 | Hanks et al. |
| 4,541,256 | A | | 9/1985 | Green |
| 4,570,470 | A | | 2/1986 | Gray, Sr. |
| 4,576,315 | A | | 3/1986 | Vitale |
| 4,662,542 | A | | 5/1987 | Vitale |
| 5,027,626 | A | | 7/1991 | Appelbaum |
| 5,033,280 | A | | 7/1991 | Johnson |
| 5,092,359 | A | | 3/1992 | Wirth et al. |
| 5,152,313 | A | * | 10/1992 | Chapman, Jr. .............. 137/382 |
| 5,201,202 | A | | 4/1993 | Kam |
| 5,238,141 | A | | 8/1993 | Callegari et al. |

(Continued)

OTHER PUBLICATIONS

Nibco, Inc., Valves Brochure, prior to Nov. 6, 1998 (admitted prior art).

*Primary Examiner*—A. Michael Chambers
(74) *Attorney, Agent, or Firm*—Roy, Kiesel, Keegan & DeNicola

(57) ABSTRACT

A valve cover having a valve cover body, preferably of two sections. These sections are placed on either side of a valve. When joined, the sections enclose the valve, but form line apertures around the lines leading to and from the valve. Once the sections are in place, a cap is placed over the sections. The cap is sized to fit the sections tightly and will prevent the sections from separating. The cap may be provided with a tongue in groove mechanism to prevent accidental removal of the cap and to help secure the cap to the valve cover body. The cap and the valve cover body are also preferably provided with locking apertures. When these locking apertures are aligned, the cap may be secured to the valve cover body with a lock. With the valve cover locked in place around a valve, access to the valve is denied.

20 Claims, 7 Drawing Sheets

U.S. PATENT DOCUMENTS

| | | |
|---|---|---|
| 5,417,093 A | 5/1995 | Heiberg et al. |
| 5,494,465 A | 2/1996 | Jenkins |
| 5,613,386 A | 3/1997 | Mire, Sr. |
| 5,797,415 A * | 8/1998 | Nicholson et al. ....... 137/15.01 |
| 5,836,345 A * | 11/1998 | Ericson ..................... 137/382 |
| 6,085,557 A | 7/2000 | Kaye, Jr. |
| 6,123,098 A | 9/2000 | Gremillion, III |
| 6,186,742 B1 | 2/2001 | Gremillion, III |
| 6,298,521 B1 | 10/2001 | Butterfield |

* cited by examiner

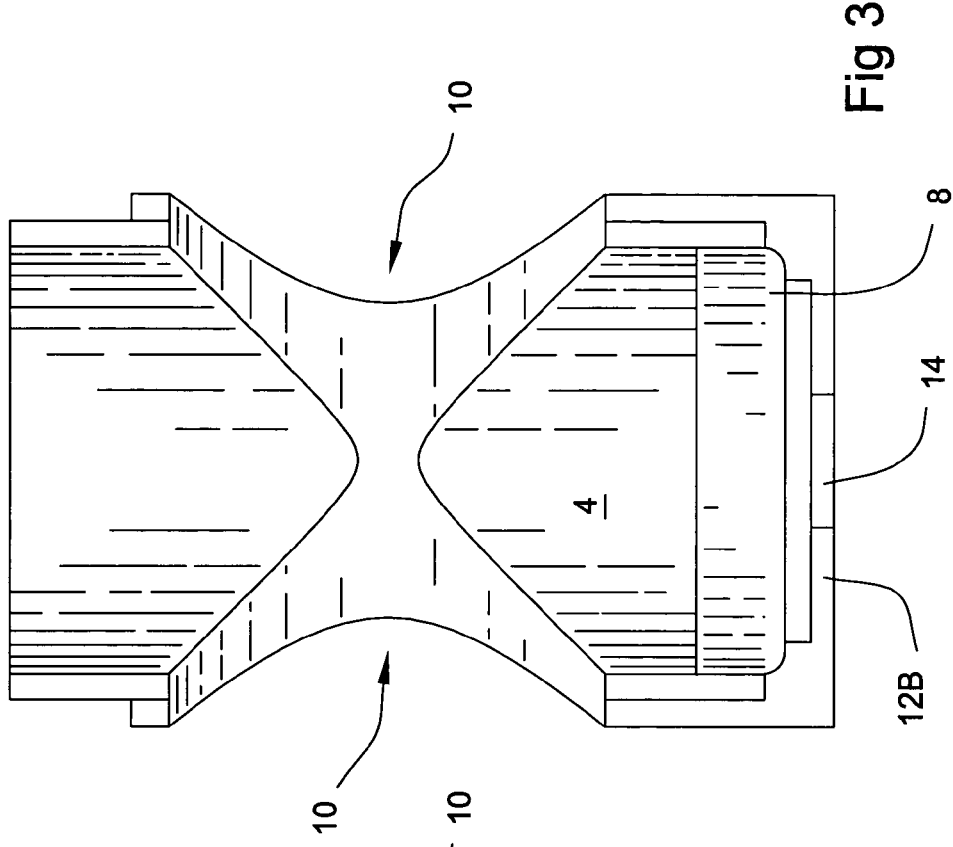

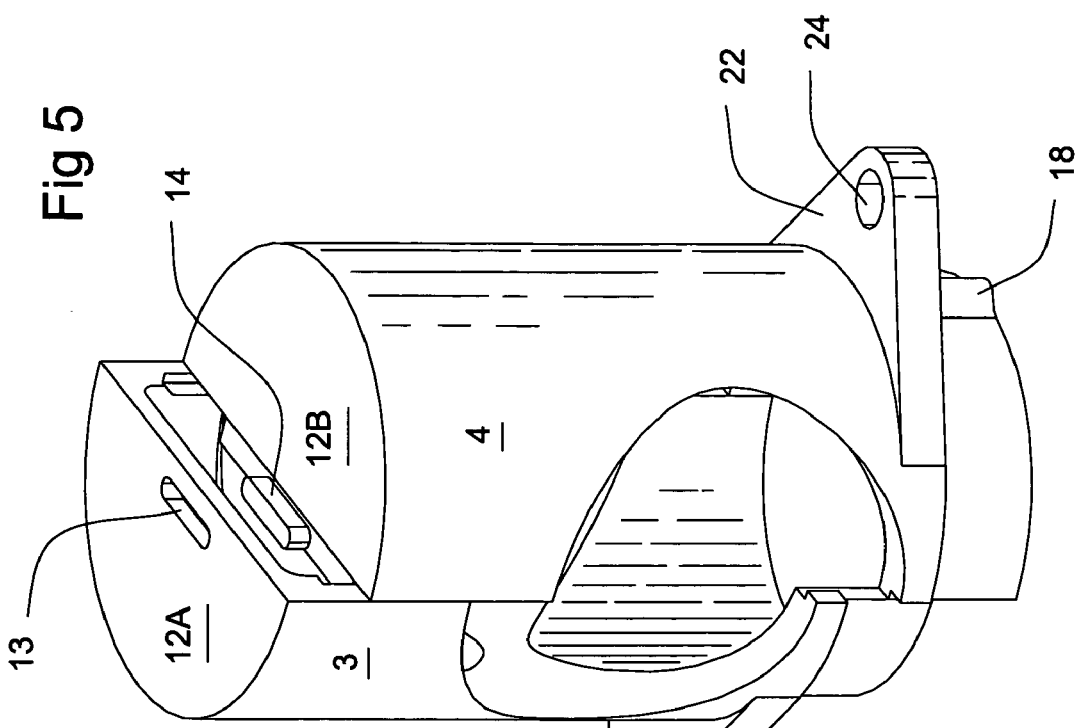
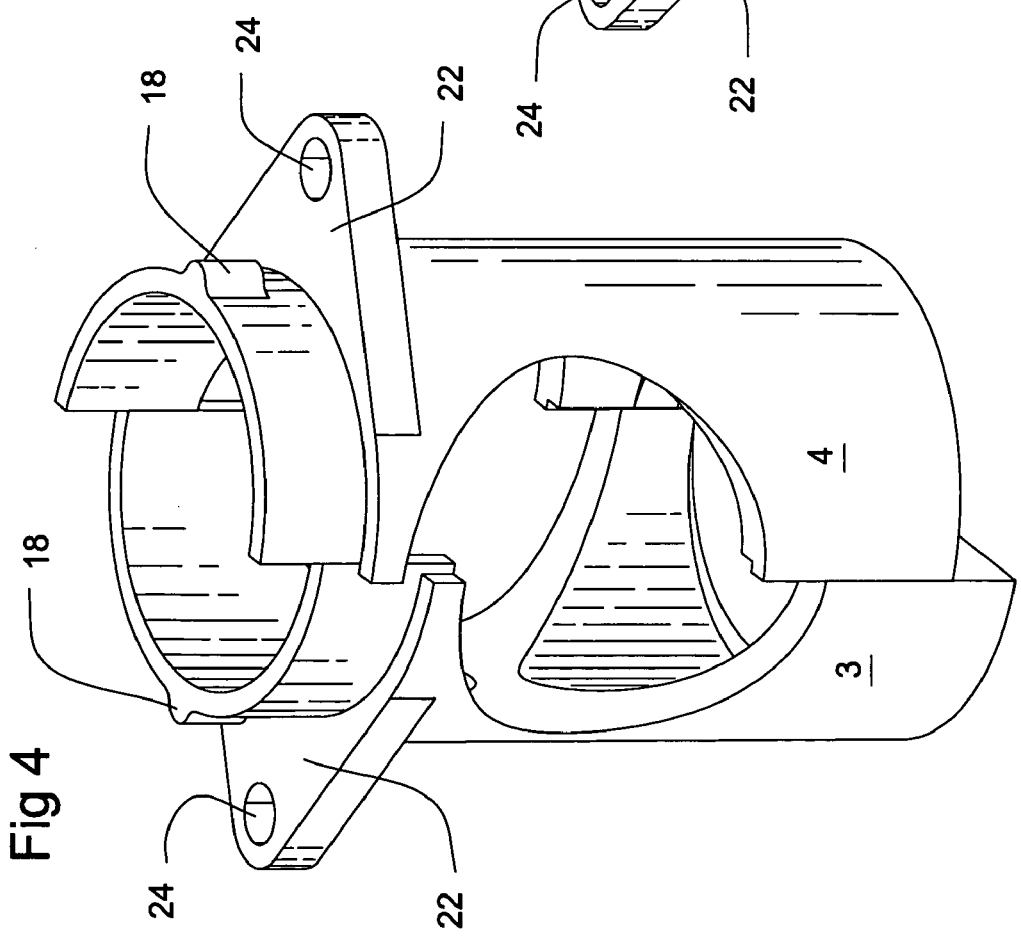

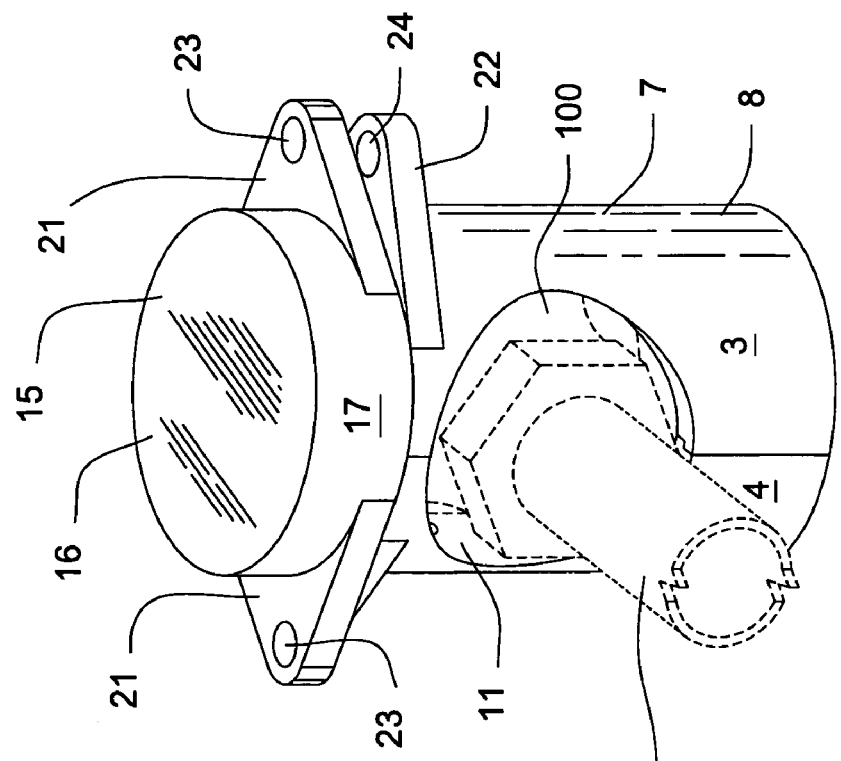
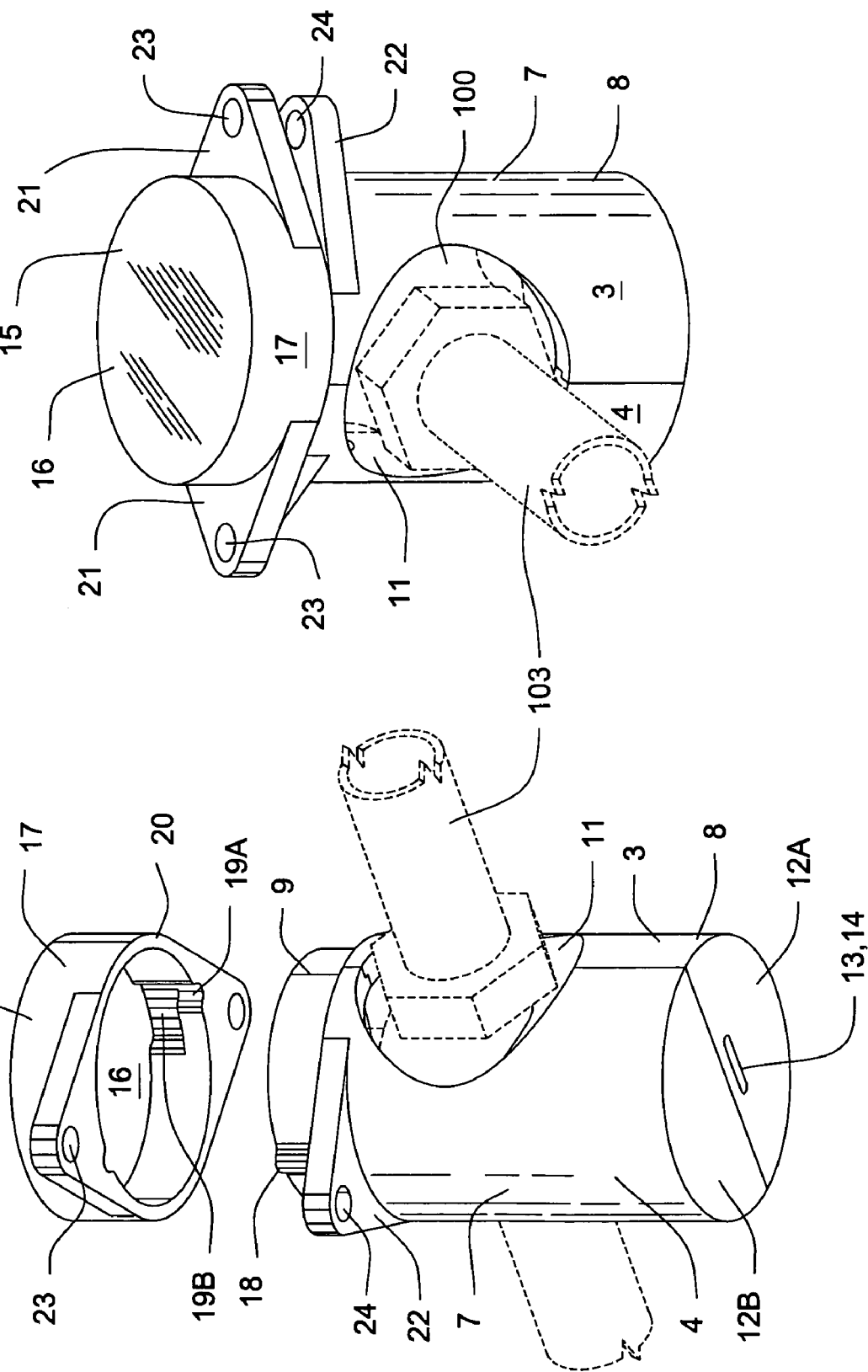
Fig 11A
Fig 11B

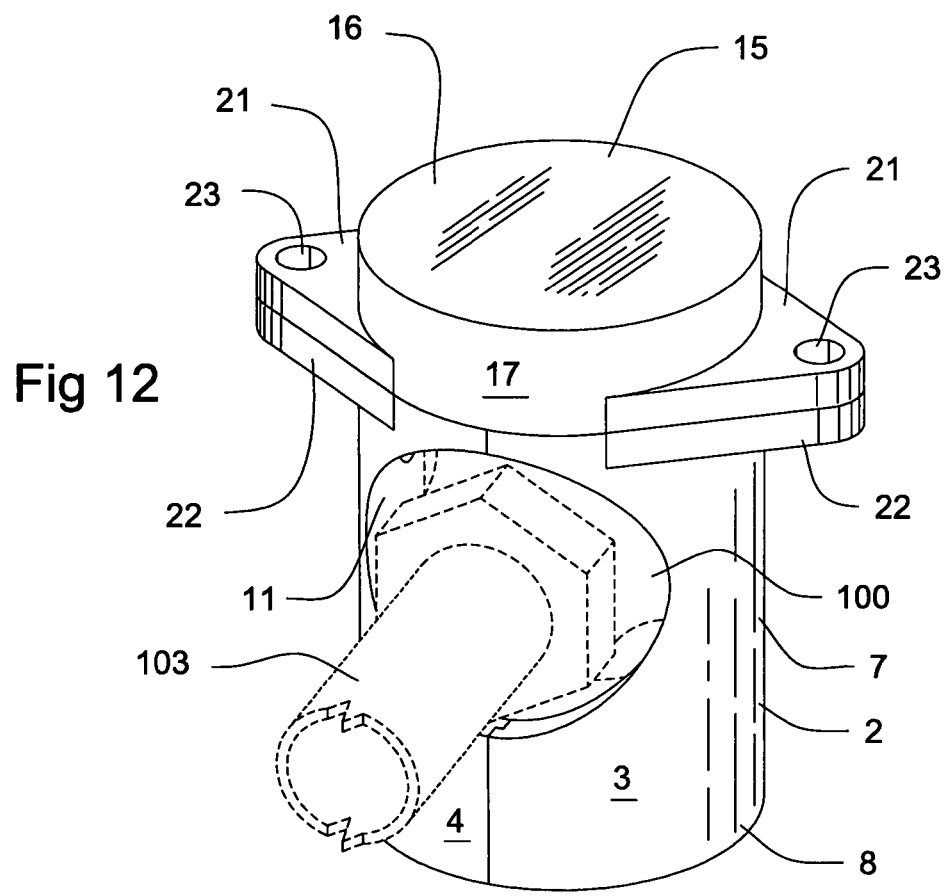
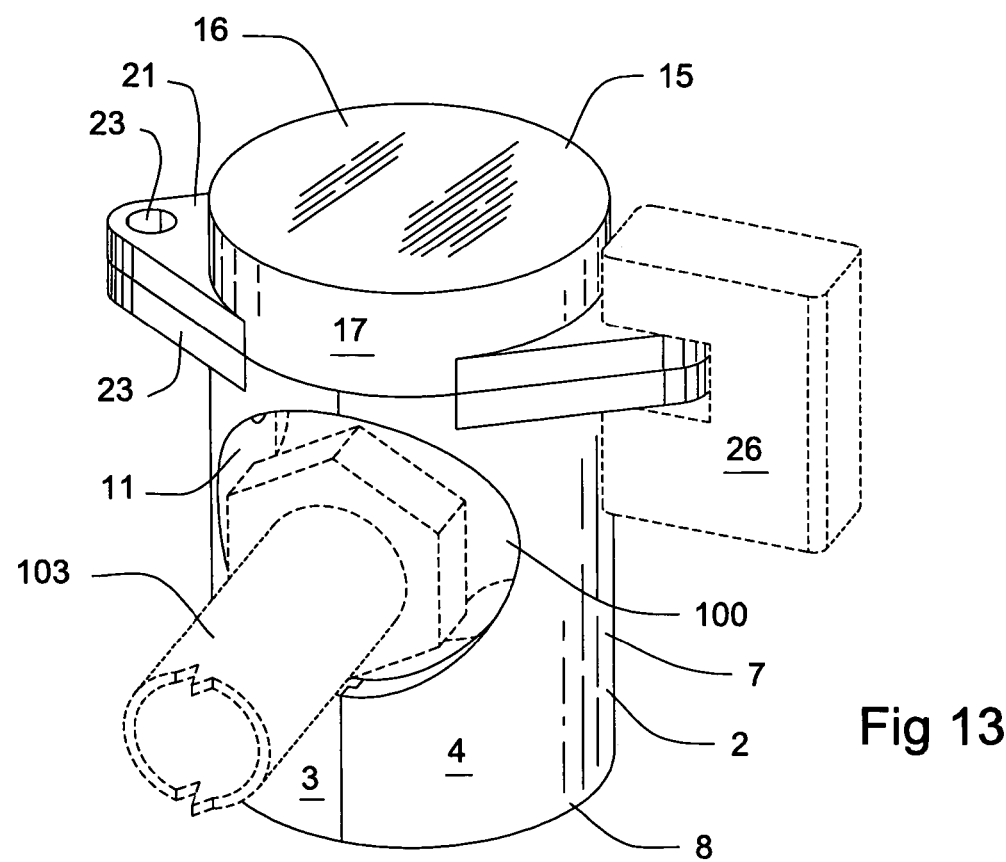

VALVE COVER

BACKGROUND OF THE INVENTION

1. Field of the Invention

The invention relates to valve covers in general and utility shut off valves covers in particular.

2. Prior Art

Many valve covers exist in the prior art to prevent the unintentional or unauthorized opening or adjustment of valves. Examples include those disclosed in U.S. Pat. No. 6,123,098 which discloses a valve cover which engages the external locking or bonnet nut of a valve assembly. While this valve cover works quite well in most applications, it falls short in valves that lack a locking nut. One common environment where external locking nuts are frequently absent are shut-off valves in utility lines.

Most gas and water lines have a shut off valve located at the curb. These shut off valves allow the utility owners and/or building owners to turn off the gas and water in the building. Utility companies may turn off gas and water when bills go unpaid or the building become unoccupied. A problem commonly faced by the utility companies are building occupants who turn the gas or water service back on. These may be persons living in the building who are simply unwilling or unable to pay their bills. However, of perhaps greater concern are persons squatting in vacant buildings. Squatters will often seek to restore gas and/or water service to a building where they have taken up residence. However, they are often unaware of problems that may exist with the gas or water lines in portions of a building they are not occupying, and even if aware, squatters have little ability or incentive to report such problems.

Thus, if there is a leak in a water line, the illicit restoration of water to an unoccupied building can result in very substantial damage to the building. Similarly, a leak in a gas line is a fire and explosion hazard in any building. Thus, an illicit restoration of gas service to a vacant building can lead to a particularly dangerous condition Of course, anytime a utility line is opened surreptitiously, there is little chance of the utility company receiving payment for the water or gas used. Thus, unauthorized opening of service lines also represent a substantial loss of revenue to utility companies.

For all of the foregoing reasons, utility companies generally do more than simply close the shut off valves on their service lines. However, placing a lock on the shut off valve seems to invite occupants and squatters to attack the locking mechanism in an effort to overpower it. These efforts lead, not infrequently, to damage to the valve and/or utility line, such that a leak may then exist at the street level. Thus, most shut off valves are wholly contained units with no external locking nut that could serve as a point of leverage for someone attempting to overpower the locking mechanism.

The configuration of many shut off valves leads to a dearth of valve covers that can be used to secure the shut off valve. The lack of effective shut off valve covers and the risks associated with unauthorized utility restoration leads some utilities to sever and plug utility lines when they are turned off. Such measures are undesirable because they cost more to implement and more to reverse if utility service is restored in the future. Therefore, a valve cover meeting the following objectives is desired

OBJECTS OF THE INVENTION

It is an object of the invention to provide a valve cover suitable for securing valves that lack an external bonnet nut.

It is another object of the invention to provide a valve cover for shut off valves in water lines.

It is still another object of the invention to provide a valve cover for shut off valves in gas lines.

It is yet another object of the invention to provide a valve cover that precludes access to any portion of the valve while the cover is in place.

It is still another object of the invention to provide a valve cover that may be locked securely over the valve.

It is yet another object of the invention to prevent the unauthorized operation of valves.

It is still another object of the invention prevent the unintentional operation of valves.

SUMMARY OF THE INVENTION

The invention comprises a valve cover having a valve cover body, preferably made of two sections. The sections are configured to join together to form a body having line apertures in the sides. These sections will be placed on either side of a valve and brought together. When joined, the sections will enclose the valve, but form line apertures around the inflow and outflow lines leading to and from the valve. The sections may be provided with male and female members to facilitate their engagement. Once the sections are in place around the valve, a cap is placed over the sections to complete the valve cover. The cap is sized to fit the sections tightly and will prevent the sections from separating when the cap is in place. The cap may be provided with a tongue in groove mechanism to prevent the cap from being accidentally removed and to help secure the cap to the valve cover body. The cap and the valve cover body are also preferably provided with locking apertures. When these locking apertures are aligned, the cap may be secured to the valve cover body with a lock. With the valve cover locked in place around a valve, access to the valve is denied such that unauthorized and/or unintentional adjustment of the valve may be prevented.

BRIEF DESCRIPTION OF THE FIGURES

FIG. 2 is an interior side view of a preferred embodiment of a first section of a valve cover body member.

FIG. 3 is an interior side view of a preferred embodiment of a second section of a valve cover body member.

FIG. 4 is a top perspective view of a preferred embodiment of a first and second section of a valve cover body partial engaged.

FIG. 5 is a bottom perspective view of a preferred embodiment of a first and second section of a valve cover body partially engaged.

FIG. 11A is bottom perspective view of a preferred embodiment of a first and second section of a valve cover body engaged about an exemplary valve and with a preferred embodiment of a valve cover cap about to engage the valve cover body.

FIG. 11B is a top perspective view of a preferred embodiment of a first and second section of a valve cover body engaged about an exemplary valve and with a preferred embodiment of a valve cover cap engaged with the valve cover body prior to rotation.

FIG. 12 is a top perspective view of a preferred embodiment of a first and second section of a valve cover body engaged about an exemplary valve and with a preferred embodiment of a valve cover cap engaged with the valve cover body after rotation.

FIG. 13 is a top perspective view of a preferred embodiment of a first and second section of a valve cover body engaged about an exemplary valve and with a preferred embodiment of a valve cover cap fully engaged with the valve cover body with a lock in place securing the valve cover.

DETAILED DESCRIPTION OF THE PREFERRED EMBODIMENT

Figure 1:
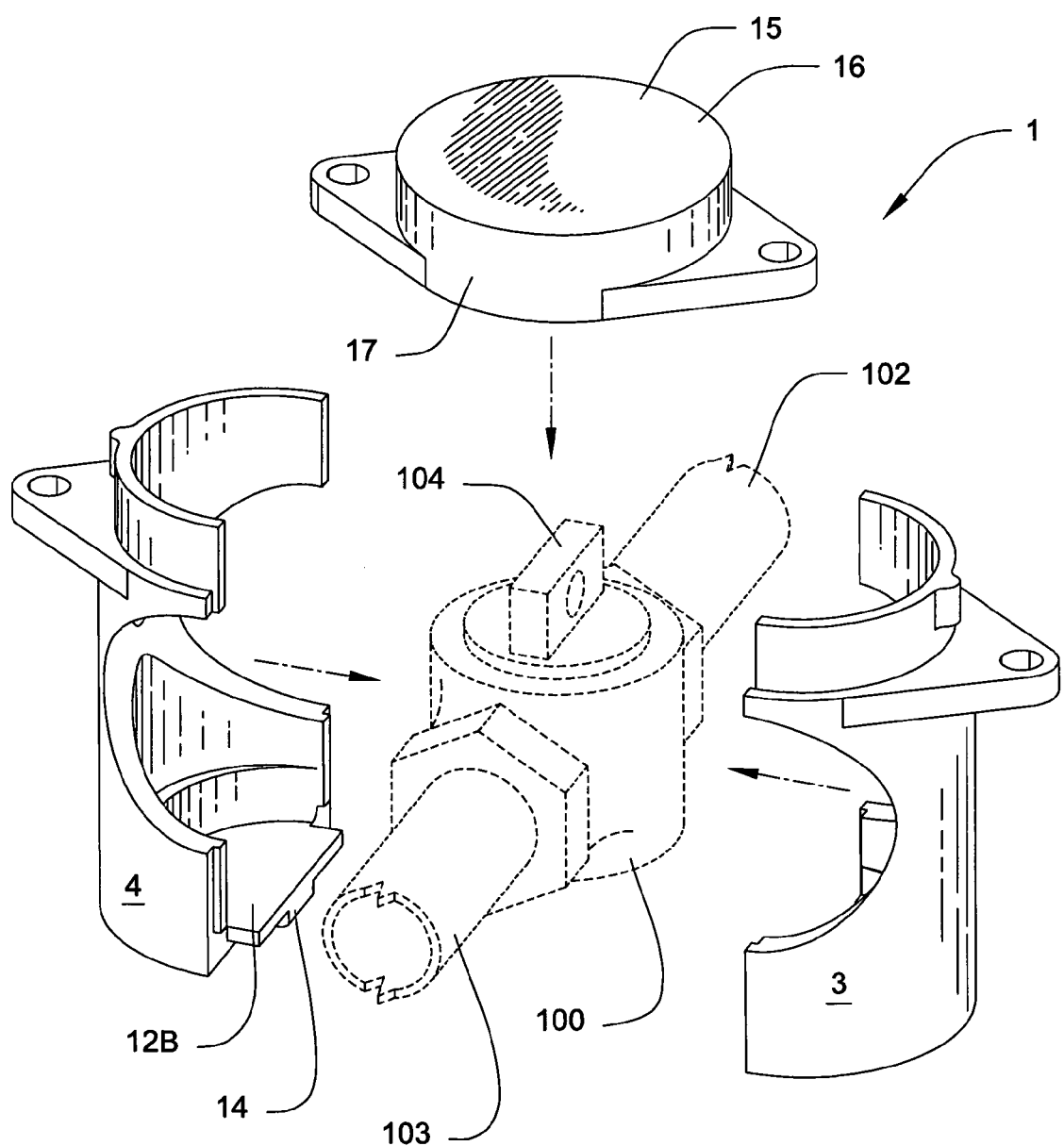
FIG. 1 is an exploded view of a preferred embodiment of a valve cover shown around an exemplary valve.
Figure 6:
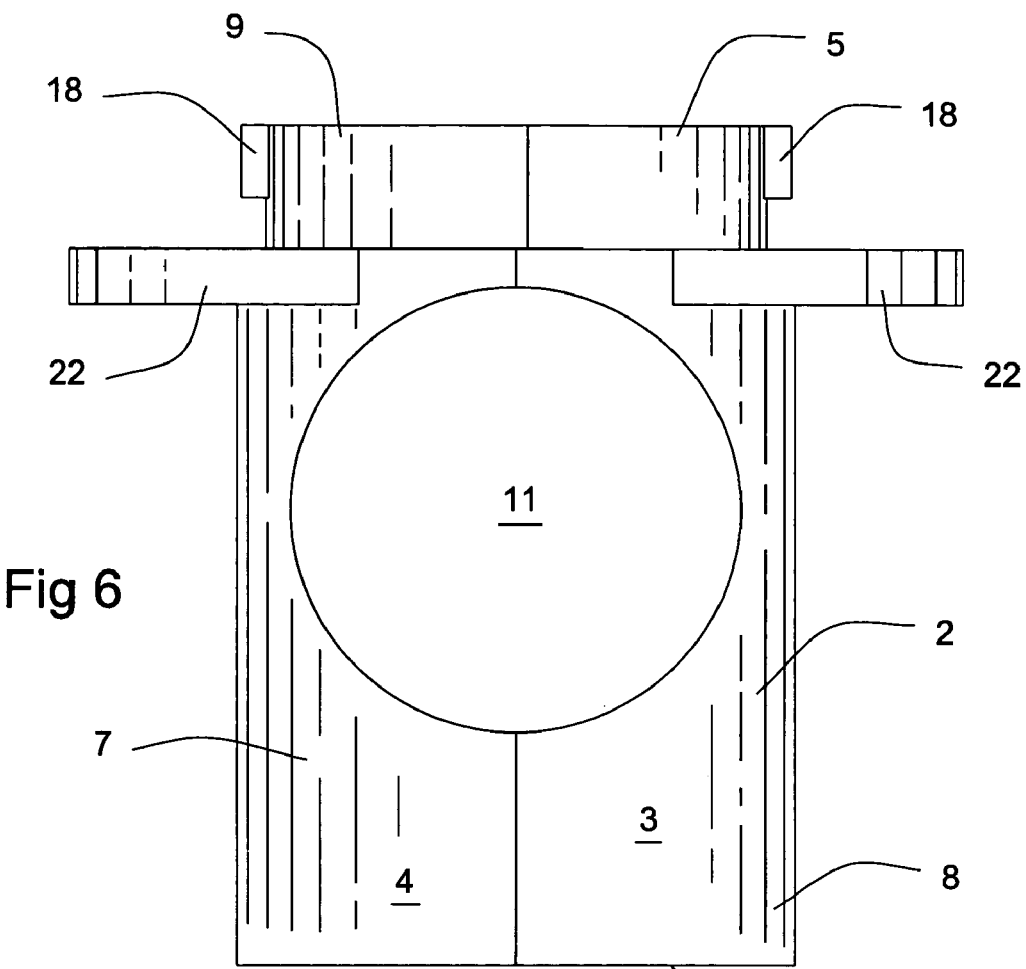
FIG. 6 is a side view of a preferred embodiment of a first and second section of a valve cover body fully engaged.
Figure 7:
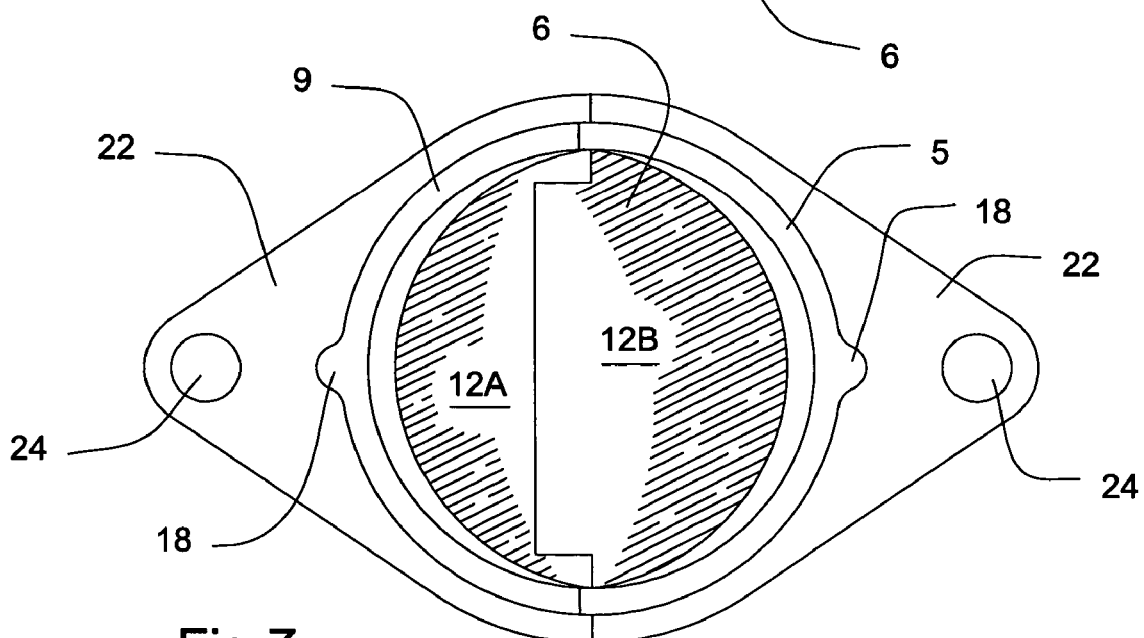
FIG. 7 is a top view of a preferred embodiment of a first and second section of a valve cover body fully engaged.
Figure 8:
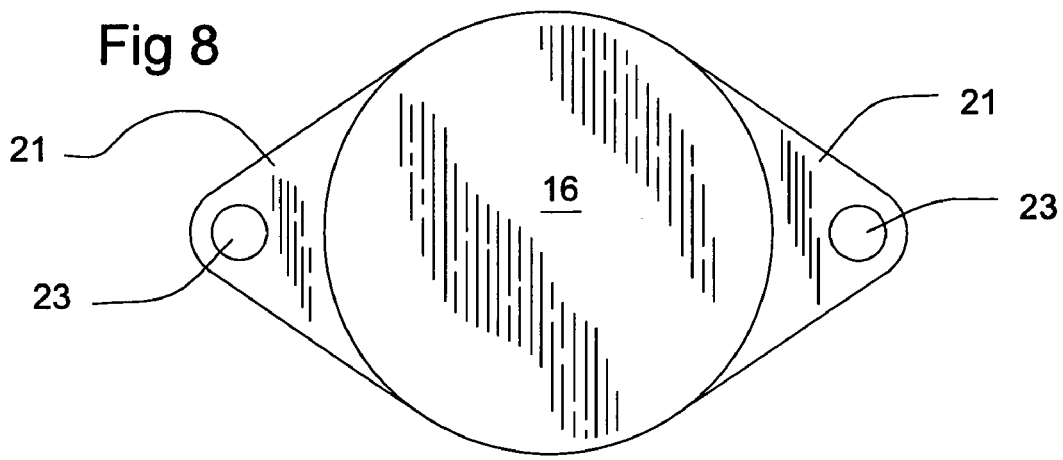
FIG. 8 is a top view of a preferred embodiment of a valve cover cap.
Figure 9:
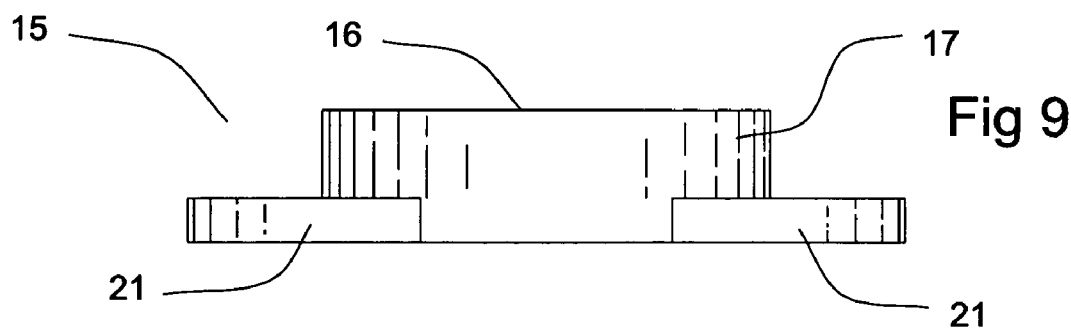
FIG. 9 is a side view of a preferred embodiment of a valve cover cap.
Figure 10:
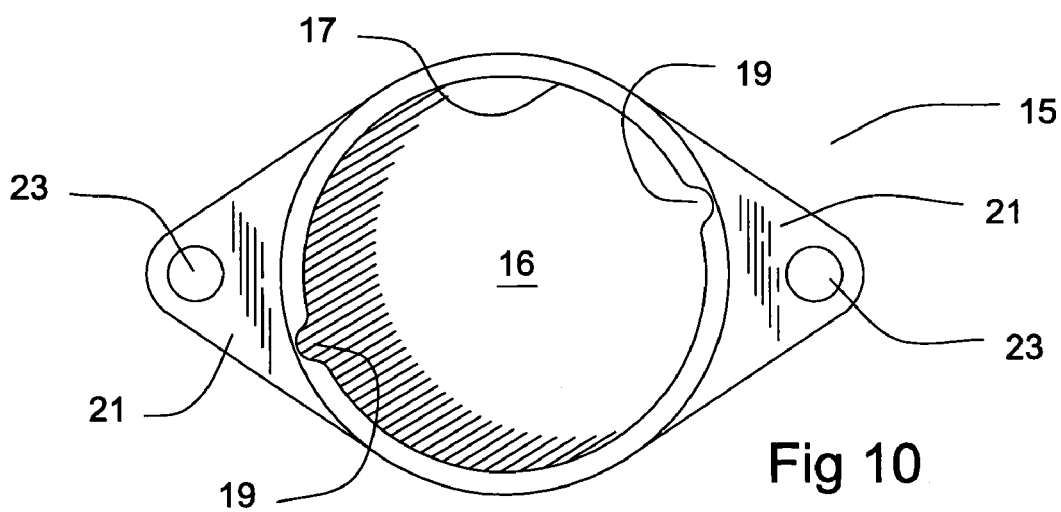
FIG. 10 is a bottom view of a preferred embodiment of a valve cover cap.

A valve cover 1 is provided for securing valves. Valve cover 1 may be used with multiple types of valves; however, it is expected to be particularly useful for use with valves 100 comprising a body 101 and having an inflow line 102 and an outflow line 103 extending from body 101. Valve 100 will also have a control 104 of some sort on or extending from body 101. Control 104 may be a wheel, a shaft, a lever, a slotted or phillips style screw head, and allen screw head, or any number of conventional devices for opening and closing the gate mechanism in valve 100.

The preferred embodiment of valve cover 1 comprises a valve cover body 2 preferably made of a first section 3 and a second section 4. Valve cover body 2 has an upper end 5 and a base 6 opposite upper end 5. Sidewalls 7 extend from upper end 5 to base 6. Sidewalls 7 have a base end 8 proximate base 6 and a cap end 9 opposite base end 8. Valve cover body 2 and particularly cap end 9 of sidewalls 7 are preferably circular in cross section.

Each section 3, 4 of valve cover body 2 preferably contain an indentation 10 at each edge. When sections 3, 4 come together, indentations 10 join to form line apertures 11 in valve cover body 2. Line apertures 11 are preferably positioned on opposite sides of valve cover body 2 from each other. Line apertures 11 are also preferably aligned with each other. However, line apertures 11 are principally designed to allow inflow line 102 and outflow line 103 passage through valve cover body 2. Thus, the relative position of line apertures 11 will be determined by the actual position of inflow line 102 and outflow line 103. If outflow line 102 and inflow line 103 are at an angle to each other, valve cover body 2 may be constructed so that line apertures 11 will be at an angle to each other as well. Similarly, if outflow line 102 and inflow line 103 are offset vertically, line apertures 11 may be offset. In the preferred embodiment, there are only two line apertures 11. However, nothing requires that this be the case. Where multiple inflow lines 102 and/or outflow lines 103 extend from valve 100, additional line apertures 11 may be provided as needed. Similarly, where only an inflow line 102 extends from valve 100, such as when valve 100 is a faucet, only one aperture 11 may be provided. Likewise, where only an outflow line 103 extends from valve 100, such as when valve 100 is positioned at the mouth of a line, only one aperture 11 may be needed.

Each section 3, 4 of valve cover body 2 preferably comprises a base section 12A, 12B. In the preferred embodiment, base section 12A contains a female opening 13 and base section 12B contains a male appendage 14. When sections 3, 4 engage, appendage 14 will engage opening 13, thereby better securing sections 3, 4 to each other and forming base section 12. Base sections 12A, 12B will preferably cover substantially all of the space at the bottom of valve cover body 2 between sidewalls 7.

A cap 15 is preferably provided to fit over upper end 5 of valve cover body 2. Cap 15 preferably has an upper surface 16 and locking walls 17 depending from upper surface 16. Locking walls 17 are preferably circular in cross section, but should be sized to engage cap end 9 of sidewalls 7 whatever the cross section of cap end 9. Cap 15 should be sized to enclose cap end 9 but to engage cap end 9 closely. When cap 15 is in place sections 3, 4 will not be able to move apart. Thus, cap 15 will lock valve cover body 2 together. This locking effect will be augmented by male appendage 14 and female opening 13.

In many applications, it is desirable that cap 15 not be unintentionally removed. Valve cover 1 may be used in industrial or commercial settings where it is not necessary to secure valve cover 1 with a lock. However, it may be important that cap 15 not be removed in such settings so that valve 100 will not be adjusted inadvertently. Particularly in such situations, it may be desirable to provide cap 15 and valve cover body 2 with a tongue in groove engagement mechanism.

In the preferred embodiment, the exterior of the cap end 9 of sidewalls 7 is provided with at least one and preferably two tongues 18. Tongue 18 will extend radially from the surface of sidewalls 7. The interior of the locking walls 17 is preferably provided with at least one groove 19, comprising a lower section 19A and an upper section 19B. One such groove 19 will preferably be provided for each tongue 18.

Lower section 19A will be positioned at the outside edge 20 of locking walls 17. Upper section 19B will be positioned between lower section 19A and upper surface 16. Lower section 19A is preferably about the same width as tongue 18, so that tongue 18 may pass through lower section 19A, but that while tongue 18 is positioned within lower section 19A, cap 15 cannot be substantially rotated about cap end 9 of sidewalls 7.

Lower section 19A will preferably provide passage into upper section 19B. Upper section 19B is preferably substantially wider than lower section 19A, such that once tongue 18 passes out of lower section 19A into upper section 19B, it will be possible to rotate cap 15, at least a distance equal to the width of upper section 19B. The amount of rotation allowed in cap 15 may vary as desired; however, cap 15 preferably should be allowed to rotate enough to move tongue 18 out of alignment with lower section 19A. In the preferred embodiment, the tolerances between cap 15 and cap end 9 of sidewalls 7 are such that when tongue 18 is contained within upper section 19B of groove 19 without access to lower section 19A, cap 15 may not be removed from cap end 9 of sidewalls 7. Thus, when cap 15 is in place, an operator will not be able to remove cap 15 from valve cover body 2 without rotating cap 15 until tongue 18 is aligned with lower section 19A. This will prevent valve cover 1 from being opened or valve 100 from being operated unintentionally.

Those skilled in the art will appreciate from the foregoing that the length of tongue 18, lower section 19A, upper section 19B and the lengths of locking walls 17 and cap section 9 should all be sized to allow tongue 18 to pass completely through lower section 19A so that the entire length of tongue 18 will be contained in upper section 19B of groove 19 when cap 15 is in place.

In many circumstances, it will be desirable to be able to lock cap 15 in place over valve cover body 2. To this end, cap 15 further comprises at least one and preferably a pair of locking ears 21 in the preferred embodiment. Each locking ear 21 comprises a tab extending radially from locking walls 17. A corresponding locking arm 22 preferably extends radially from sidewalls 7. Locking ear 21 is preferably provided with a first locking aperture 23. Similarly, locking arm 22 is provided with a second locking aperture 24. By positioning cap 15 on cap end 9 of sidewalls 7 so that first and second locking apertures 23, 24 are aligned, a lock 26 may be passed through first and second locking apertures 23, 24 so that cap 15 may be locked in place on valve cover body 2. When valve cover body 2 and cap 15 are provided with a tongue in groove engagement mechanism as described above, locking arm 22 and locking ear 21 will preferably be positioned relative to each other so that when cap 15 has been rotated the full distance allowed by the length of upper section 19B and tongue 18, first and second locking apertures 23, 24 will be aligned.

Although any type of lock 26 capable of engaging locking apertures 23, 24 may be used, a lock 26 whose locking bar is sized so that it is completely enclosed within locking arm 22 and locking ear 21 will be preferred in many context.

The various components of valve cover 1 are preferably made out of heavy gauge metal such as steel or aluminum. Aluminum or galvanized or stainless steel may be particularly desirable if valve cover 1 will be exposed to the elements. Valve cover 1 may be provided with rubber or plastic seals and/or coating if weatherproofing is desired. Similarly, valve cover 1 may be made of other metals such as titanium or copper if circumstances warrant. Similarly, valve cover 1 may be made from plastic or rubber if desired. The components of valve cover 1 may be cast, molded, machined or otherwise constructed using any conventional technique appropriate to the materials selected for valve cover 1.

In operation, the preferred embodiment of valve cover 1 is preferably assembled by positioning first section 3 and second section 4 on either side of valve 100. First and second sections 3, 4 are joined together to form valve cover body 2 around valve 100, preferably by positioning sections 3, 4 in edge-to-edge contact and then sliding sections 3, 4 until they are in alignment with each other. Where male appendage 14 and female opening 13 are used, this will motion will cause male appendage 14 and female opening 13 to interlock. Line apertures 11 in valve cover body 2 will be formed around inflow and outflow lines 102, 103 as valve cover body 2 is assembled from sections 3, 4. Once valve cover body 2 has been assembled, cap 15 will be positioned over cap end 9 of sidewalls 7, locking sections 3, 4 of valve cover body 2 together. If cap 15 is provided with one or more grooves 19 and sidewalls 7 are provided with at least one tongue 18, cap 15 will be positioned so that lower portion 19A of grooves 19 are aligned with tongue 18 as cap 15 is inserted over cap end 9 of sidewalls 7. Once cap 15 is fully inserted over cap end 9, cap 15 will be rotated as far as upper section 19B of groove 19 and tongue 18 will allow. This rotation will preferably bring locking apertures 23, 24 of locking ear 21 and locking arm 22 into alignment. Cap 15 may then be secured to valve cover body 2 by securing lock 26 through locking apertures 23, 24. Lock 26 will prevent cap 15 from rotating. If cap 15 cannot rotate, tongue 18 cannot be brought back into alignment with lower section 19A of groove 19 which will prevent the removal of cap 15 from valve cover body 2. With cap 15 in place, valve cover body 2 cannot be disassembled. Thus, with valve cover body 2 in place around valve 100 and cap 15 in locked in place, valve cover 1 will completely surround and will preclude any access to valve 100.

Other uses, embodiments, and applications of the invention, equivalent to those disclosed herein, will occur to those skilled in the art, and are intended to be included within the scope and spirit of the following claims.

I claim:

1. A method of securing a valve having a body, an inflow line and an outflow line extending from said body, and a control unit configured to cover and enclose said valve utilizing a valve cover comprising:
   a valve cover body second section configured to engage said valve cover body first section to form a valve cover body having an upper end opposite a base and sidewalls extending therebetween, said sidewalls having a base end proximate said valve cover body base said a cap end opposite said base end, said sidewalls containing a pair of line apertures positioned to allow passage through said valve cover body;
   a cap configured to fit over and enclose said cap end of said sidewalls when said valve cover body first section is engaged with said valve cover body second section, said cap further configured to preclude said valve cover body halves from disengaging when said cap is in place, wherein the method comprises:
   (a) positioning said valve cover body first section on one side of said valve body;
   (b) positioning said valve cover body second section on an opposite side of said valve body;
   (c) engaging said valve cover body first section with said valve cover body second section to form said valve cover body around said valve body and to position one of said line apertures around said inflow line and to position another of said line apertures around said outflow line;
   (d) engaging said cap end of said sidewalls with said cap.

2. A method of securing a valve according to claim 1 wherein said cap further comprises a locking ear having a first locking aperture and a locking arm having a second locking aperture, wherein said locking arm and said locking ear are configured to align said first locking aperture with said second locking aperture when said cap engages said sidewalls, wherein said method further comprises securing said locking ear to said locking arm by passing a lock through said first and second locking aperture and locking said lock.

3. A valve cover comprising
   a valve cover body first section;
   a valve cover body second section configured to engage said valve cover body first section to form a valve cover body having an upper end opposite a base and sidewalls extending therebetween, said sidewalls having a base end proximate said valve cover body base said a cap end opposite said base end, said sidewalls containing at least one line aperture positioned to allow passage into said valve cover body;
   a cap configured to fit over and enclose said cap end of said sidewalls when said valve cover body first section is engaged with said valve cover body second section, said cap further configured to preclude said valve cover body halves from disengaging when said cap is in place.

4. A valve cover comprising
a valve cover body first section;
a valve cover body second section configured to engage said valve cover body first section to form a valve cover body having an upper end opposite a base and sidewalls extending therebetween, said sidewalls having a base end proximate said valve cover body base said a cap end opposite said base end, said sidewalls containing a pair of line apertures positioned to allow passage through said valve cover body;
a cap configured to fit over and enclose said cap end of said sidewalls when said valve cover body first section is engaged with said valve cover body second section, said cap further configured to preclude said valve cover body halves from disengaging when said cap is in place.

5. A valve cover according to claim 4 wherein said cap comprises an upper surface and locking walls depending therefrom, said locking walls sized to receive said cap end of said sidewalls of said valve cover body.

6. A valve cover according to claim 5 wherein said cap end of said sidewalls of said valve cover body comprises at least one tongue and wherein said locking walls of said cap contain at least one groove sized to receive said at least one tongue, said locking walls, said sidewalls, said at least one tongue and said at least one groove positioned and configured to preclude insertion of said cap over said sidewalls except when said at least one tongue is aligned with said at least one groove.

7. A valve cover according to claim 6 wherein said at least one groove comprises a lower section and an upper section, wherein said lower section is substantially the same width as said at least one tongue and wherein said upper section is substantially wider than said at least one tongue, said lower section providing passage to said upper section, wherein said lower section is positioned and configured to allow said at least one tongue to pass through said lower section of said at least one groove into said upper section of said at least one groove when said cap is positioned over said sidewalls.

8. A valve cover according to claim 7 wherein said cap is configured to be rotated about said cap end of said sidewalls when said at least one tongue is positioned in said upper section of said at least one groove.

9. A valve cover according to claim 8 wherein said cap is configured so that when said cap is rotated said, said at least one tongue will be moved out of alignment with said lower section of said at least one groove and wherein said cap is further configured to preclude the removal of said cap from said cap end of said sidewalls when said at least one tongue is not in alignment with said lower section of said at least one groove.

10. A valve cover according to claim 9 wherein said cap further comprises a locking ear, said locking ear comprising a first locking aperture.

11. A valve cover according to claim 10 wherein said valve cover body further comprises a locking arm, said locking arm comprising a second locking aperture.

12. A valve cover according to claim 11 wherein said locking arm and said locking ear are configured to align said first locking aperture with said second locking aperture when said cap engages said sidewalls, whereby said cap may be locked in place by securing said first locking aperture to said second locking aperture with a lock.

13. A valve cover according to claim 1 wherein said cap further comprises a locking ear, said locking ear comprising a first locking aperture.

14. A valve cover according to claim 13 wherein said valve cover body further comprises a locking arm, said locking arm comprising a second locking aperture.

15. A valve cover according to claim 14 wherein said locking arm and said locking ear are configured to align said first locking aperture with said second locking aperture when said cap engages said sidewalls, whereby said cap may be locked in place by securing said first locking aperture to said second locking aperture with a lock.

16. A valve cover according to claim 1 wherein said first section and said second section are capable of fully disengaging from each other.

17. A valve cover according to claim 1 wherein said valve cover first section contains a first base section and wherein said valve cover second section contains a second base section, wherein said first base section is configured to interlock with said second base section to form said base.

18. A valve cover according to claim 17 wherein said base fills substantially all space between said base ends of said sidewalls.

19. A valve cover according to claim 1 wherein said line apertures are positioned on substantially opposite sides of said housing.

20. A valve cover according to claim 19 wherein said line apertures are substantially aligned with each other.

* * * * *